United States Patent [19]
Kuo et al.

[11] Patent Number: 5,502,595
[45] Date of Patent: Mar. 26, 1996

[54] COLOR FILTERS AND THEIR PREPARATION

[75] Inventors: Lee-Ching Kuo; Fang-Chuan Ho, both of Hsinchu; William Lee, Taichung; Yean-Kuen Fang, Tainan, all of Taiwan

[73] Assignee: Industrial Technology Research Institute, Taiwan

[21] Appl. No.: 253,907

[22] Filed: Jun. 3, 1994

[51] Int. Cl.$^6$ .............................. G02B 5/28; G02B 1/10; G02B 5/22

[52] U.S. Cl. ................. 359/589; 359/588; 359/586; 359/890

[58] Field of Search ............................ 359/359, 360, 359/586, 588, 589, 590, 885, 890, 569, 580, 585, 587

[56] References Cited

U.S. PATENT DOCUMENTS

| | | | |
|---|---|---|---|
| 4,545,646 | 10/1985 | Chern et al. | 359/569 |
| 4,659,178 | 4/1987 | Kyogoku | 359/890 |
| 4,865,405 | 12/1988 | Kageyama | 359/890 |
| 4,887,886 | 8/1989 | Shimizee et al. | 359/589 |

OTHER PUBLICATIONS

Rung–Ywan Tsai et al., "Optical Characterization of Amorphous SiNx:H Films Prepared by Plasma_Enhanced CVD", Mat. Res. Soc. Symp. Proc. vol. 281. pp. 803–808.

S. Nitta et al., "Anomalous Reflectance in Random Amorphous Multilayers a—Si:H/Si$_{1l-x}$N$_x$" Journal of Non–Crystalline Solids 137 & 138 (1991) pp. 1095–1098.

M. Beaudion et al., "Blue_Shift of the Optical Bandgap of a—SiH:/a—SiN$_x$:H Multilayer Structures" Journal of Non–Crystalline Solids 137 & 138 (1991) pp. 1099–1102.

Rung–Ywan Tsai et al., "Amorphous Silicon and Amorphous Silicon Nitride Films Prepared By Plasma–Enhanced CVD Process as Coating Materials", Applied Optics, vol. 32, No. 28, 1993 Oct. pp. 5561–5566.

*Primary Examiner*—Martin Lerner
*Assistant Examiner*—Audrey Chang
*Attorney, Agent, or Firm*—Banner & Allegrett, Ltd.

[57] ABSTRACT

A color filter comprising a transparent substrate and two or more multilayer films of amorphous silicon materials deposited on said substrate, each film being different, each layer of said two or more multi-layer films having a thickness less than the wavelength of the visible light and at least three layers of said two or more multi-layer films of amorphous silicon materials in an alternate arrangement wherein the amorphous silicon materials are selected from a-SiOx and a-SiNx is described. A method of preparing the color filter comprising depositing on the substrate by PECVD method two or more multilayer films is also described. The color filters prepared by PECVD method have a more compact texture and a better environmental resistant. The PECVD method for the preparation of the filters is more efficient than conventional methods.

21 Claims, 12 Drawing Sheets

COLOR FILTERS AND THEIR PREPARATION

BACKGROUND OF THE INVENTION

The present invention relates to a novel color filter and, in particular, to a novel color filter useful in the visible light range. The present invention also relates to a method for preparing the color filter.

Filters are optical lenses which are light reflective, anti-reflective, or light transmissive. They are sometimes named as reflectors, anti-reflectors, lenses, etc. according to the different purposes for which they are used (the light portions not transmitted are the portions that are reflected or absorbed, so the reflectors and the lenses function on substantially the same principle but are used for different purposes) and thus generally referred to as filters.

Filters are widely used in a variety of fields. For example, color televisions, color monitors, color decorative lamps, color image readers, as well as various optical instruments involving colors all use filters. In general, there are two types of filters: filters having a substrate (such as a transparent substrate, e.g. glass or plastics) to which an additive is added such that the lens itself provides a filtering effect, and filters having a substrate coated with films which contain one single layer or multiple layers and referred to as coated optical films, such that when light passes through the films, required reflection, interference, filtration or absorption will be resulted to achieve the desired filtering effect. The film having more than two layers is called a multilayer film. The present invention relates to the application of the latter type of filters.

As for the coated type of color filters, the materials used are closely related with the methods for preparing the filters. That is, the use of materials is restricted for different preparation methods, and the properties of the filters are affected by different materials.

Conventional methods for preparing coated filters include electron-beam gun evaporation, sputtering, and thermal evaporation processes. The materials used in these processes comprise oxides (such as silicon oxide), metal oxides (such as titanium oxide, aluminum oxide, etc.), and metals (such as aluminum, manganese, tungsten, magnesium). U.S. Pat. No. 4,887,886 discloses a filter having a single coating layer comprising silicon oxide and silicon carbide in a composite state, or silicon oxide and silicon nitride in a composite state. In that patent, the coating film is formed by vapor deposition, sputtering or ion plating. U.S. Pat. No. 4,865,405 discloses an optical filter with two multilayer films, wherein the materials for the films are not amorphous and include titanium oxide, zinc sulfide, aluminium oxide, magnesium fluoride, etc. and wherein the method for preparing the coating films is a conventional method, such as electron-beam gun evaporation. However, there are several disadvantages in association with the processes and materials disclosed in the prior art. For example, a longer time for preparation is required; when the composition of films is changed, further formulation is necessary and is extremely inconvenient; and the prepared filters provide a poor resistance to environmental changes, such as changes in temperature and humidity.

SUMMARY OF THE INVENTION

Accordingly, it is an object of the present invention to provide a novel color filter having a better environmental resistance. The color filter comprises a transparent substrate and two or more different multilayer films of amorphous silicon (a-Si) materials formed thereon. The multilayer film comprises at least three layers of amorphous silicon materials.

It is another object of the present invention to provide a novel method for preparing the color filter such that the finished products prepared therefrom are practical for use.

It is yet another object of the present invention to provide a novel method for preparing the color filter, which is faster and more convenient in operation than conventional methods.

It is a further object of the present invention to provide a novel method for preparing the color filter having multilayer films coated thereon. It is more convenient to change the components of the films during the coating operation.

It is another further object of the present invention to provide a novel method for preparing the color filter having multilayer films that can be carried out under a reasonable temperature.

To achieve the above objects, the present invention uses a glow discharge chemical vapor deposition method (referred to briefly as GD-CVD), also called plasma enhanced CVD method (referred to briefly as PECVD) to deposit two or more different multilayer films on a substrate to form the color filter. Materials used in the PECVD method are amorphous silicon materials which are selected from the group consisting of a-SiOx (amorphous silicon oxide), a-SiNx (amorphous silicon nitride) and a-SiCx (amorphous silicon carbide).

BRIEF DESCRIPTION OF THE DRAWINGS

The present invention as set forth in the claims will be further explained with reference to the annexed tables and drawings, wherein:

Table 1 shows the deposition conditions and experimental data for SiOx in different growth times;

Table 2 shows the deposition conditions and experimental data for SiNx under different flows of SiH$_4$ gas;

Table 3 shows the deposition conditions and experimental data for SiNx under different flows of SiH$_4$ gas admixed with NH$_3$ gas;

Table 4 shows the data for preparing multilayer film A for a red-color filter;

Table 5 shows the data for preparing multilayer film B for a red-color filter;

Table 6 shows the data for preparing multilayer film A for a green-color filter;

Table 7 shows the data for preparing multilayer film B for a green-color filter;

Table 8 shows the data for preparing multilayer film A for a blue-color filter;

Table 9 shows the data for preparing multilayer film B for a blue-color filter; and Table 10 shows the data for preparing multilayer film A for a green-color filter having one single substrate.

Figure 1:
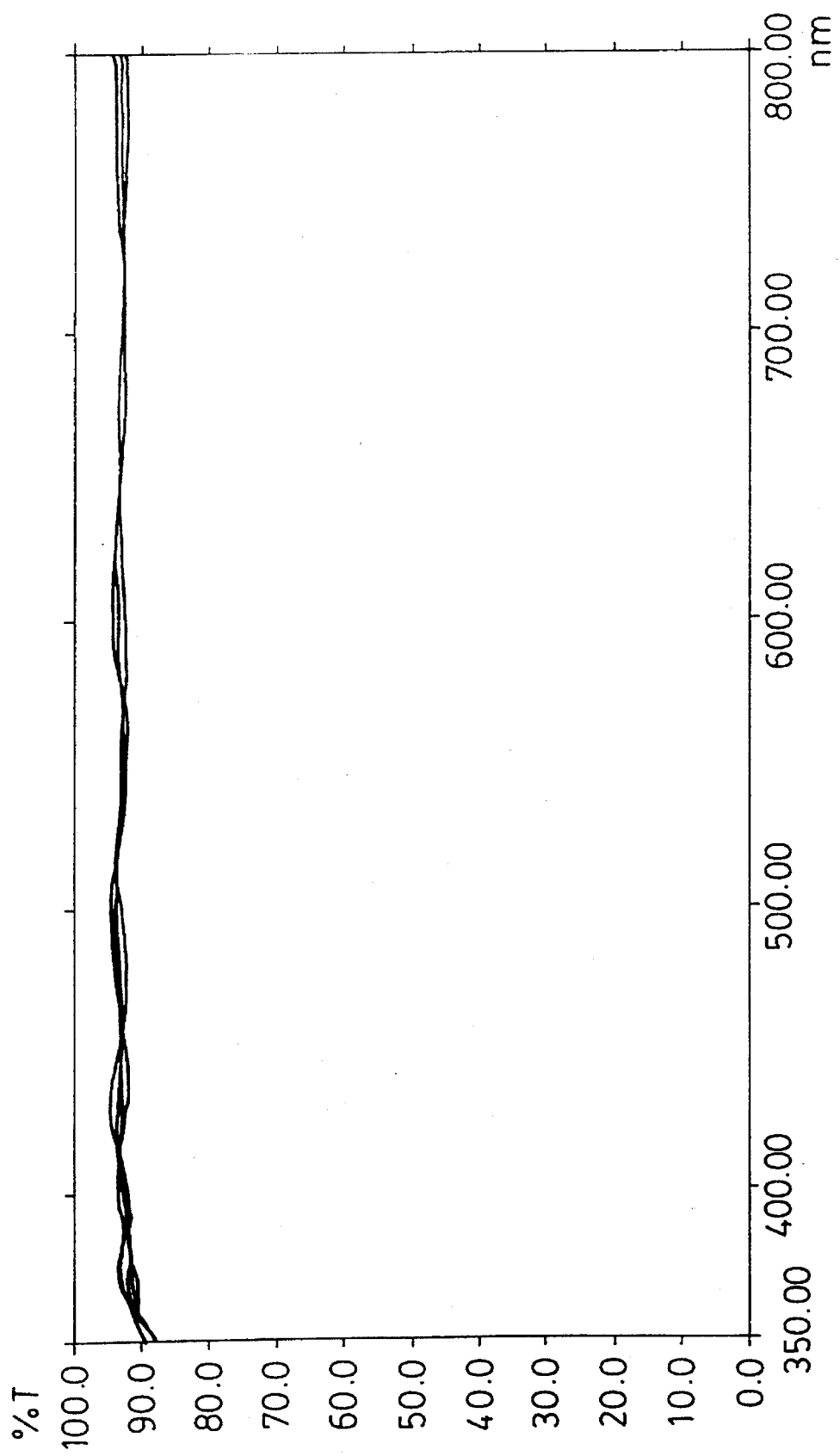
Figure 2:
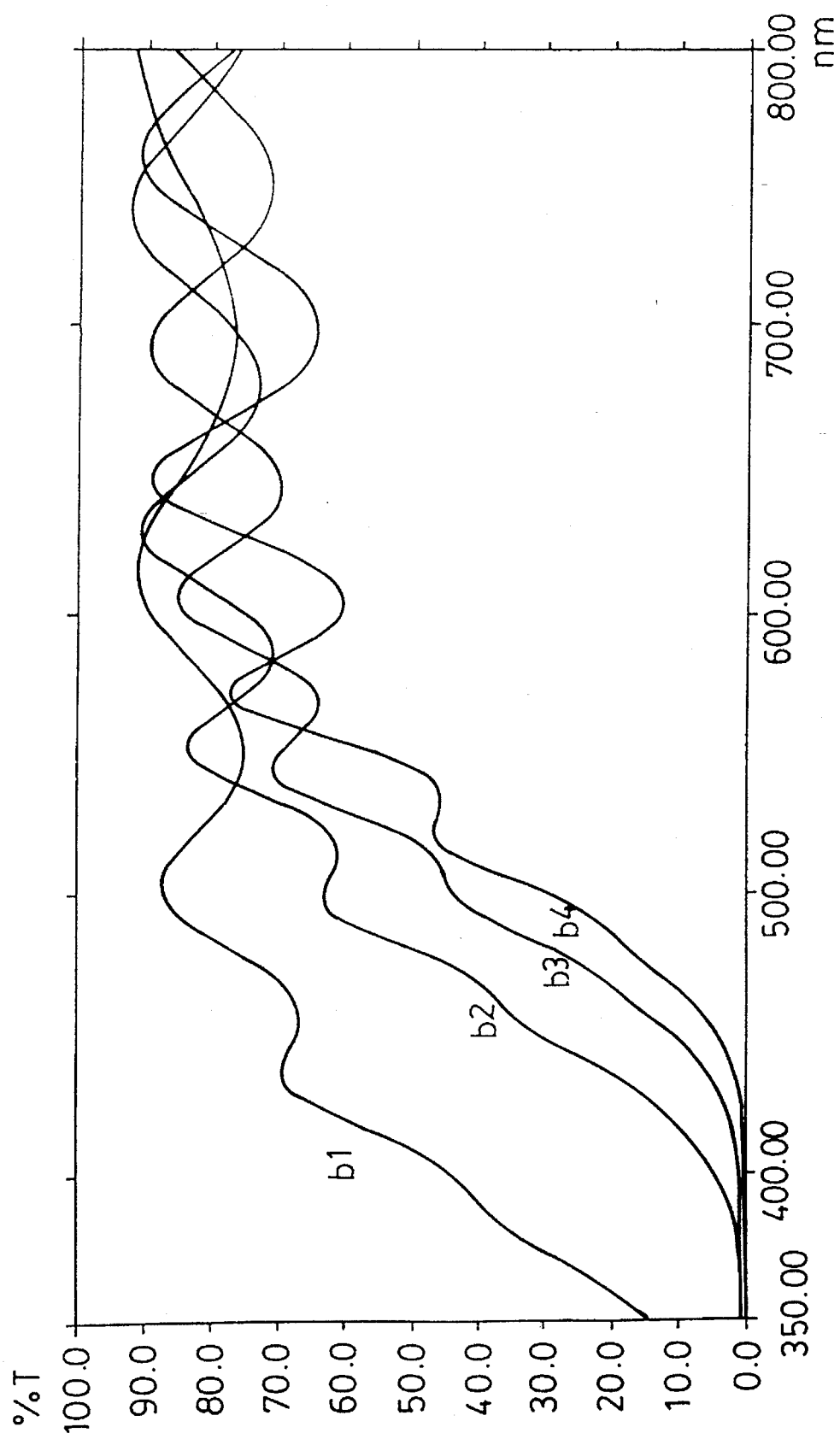
Figure 3:
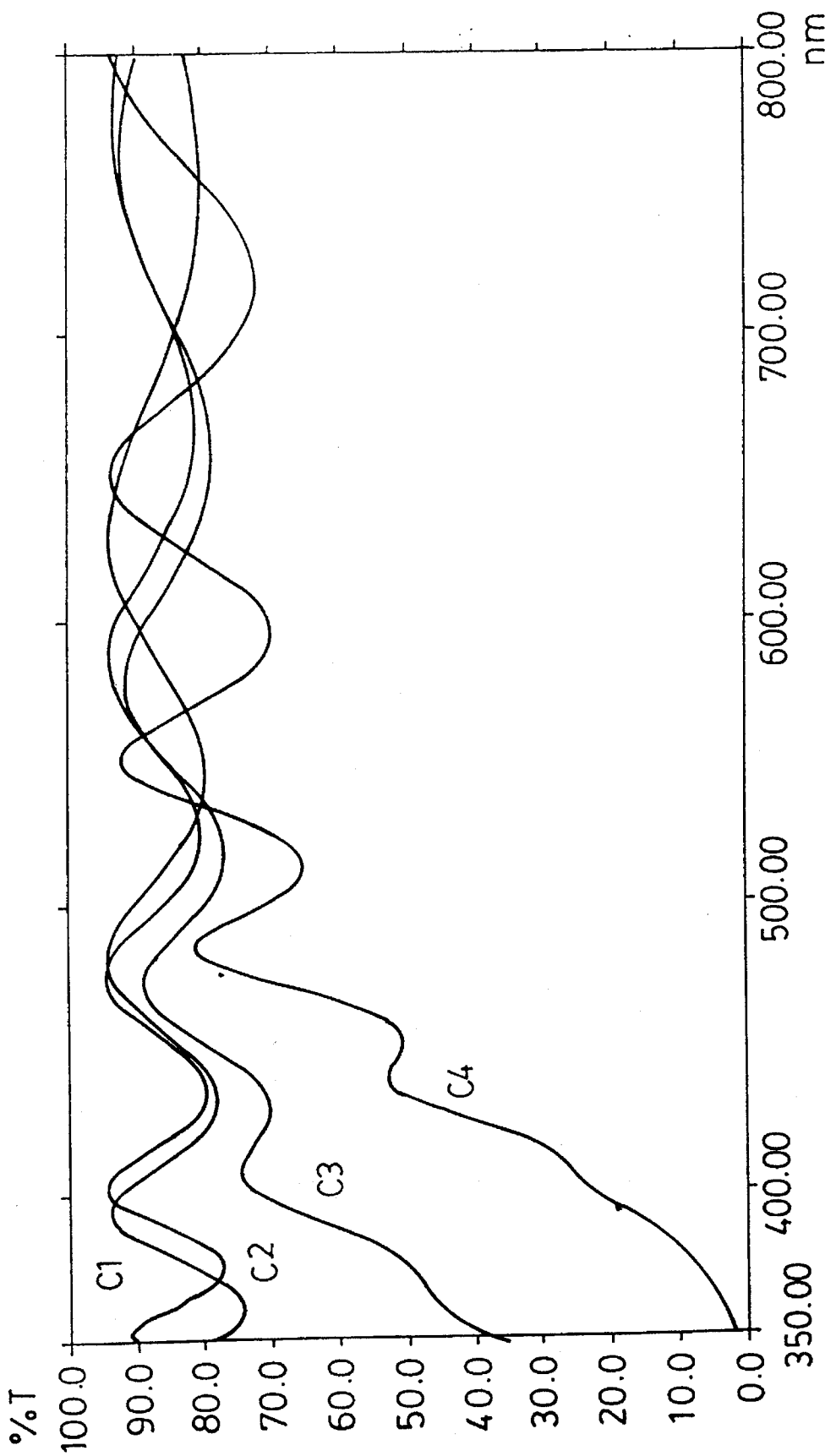
Figure 4:
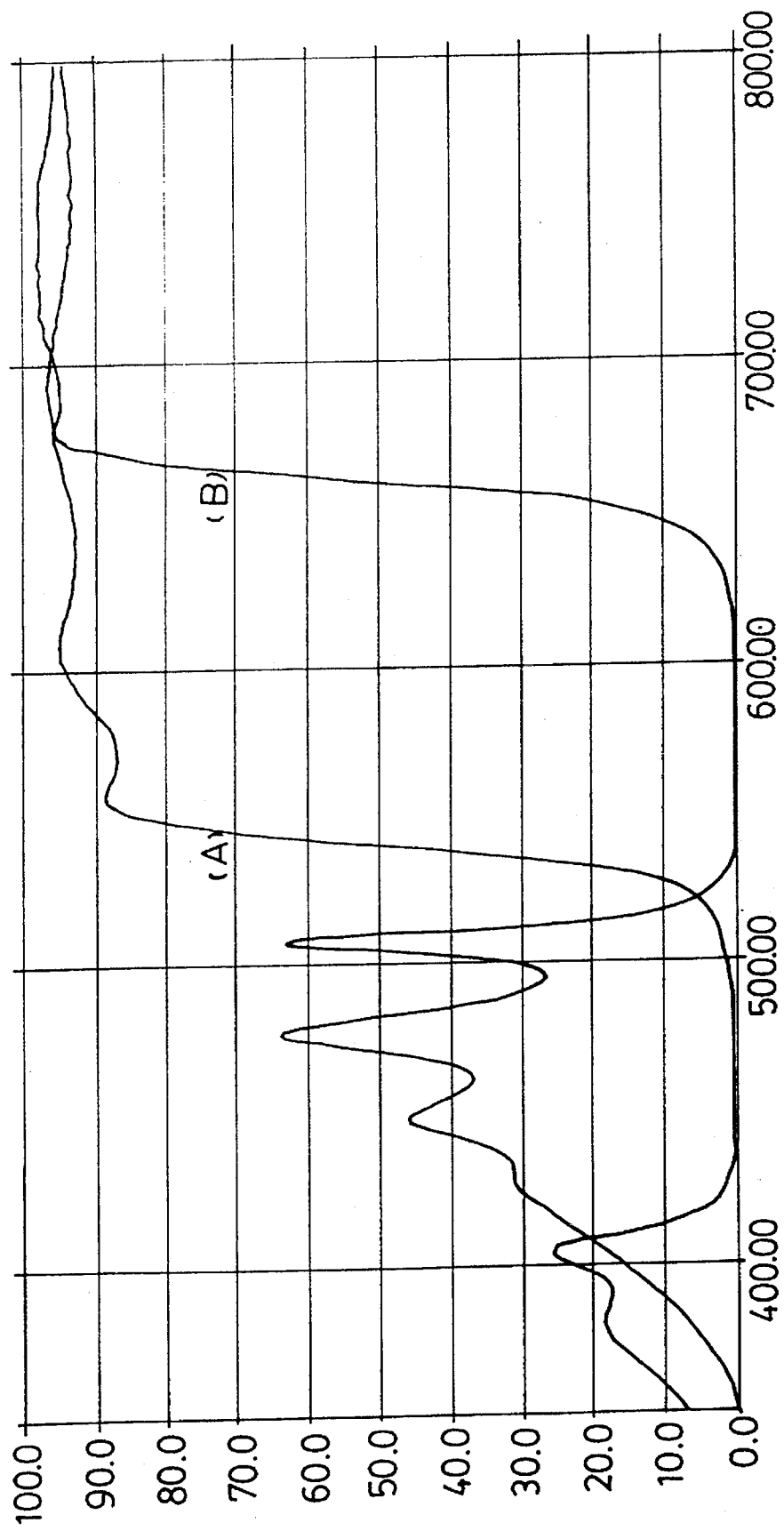
Figure 5:
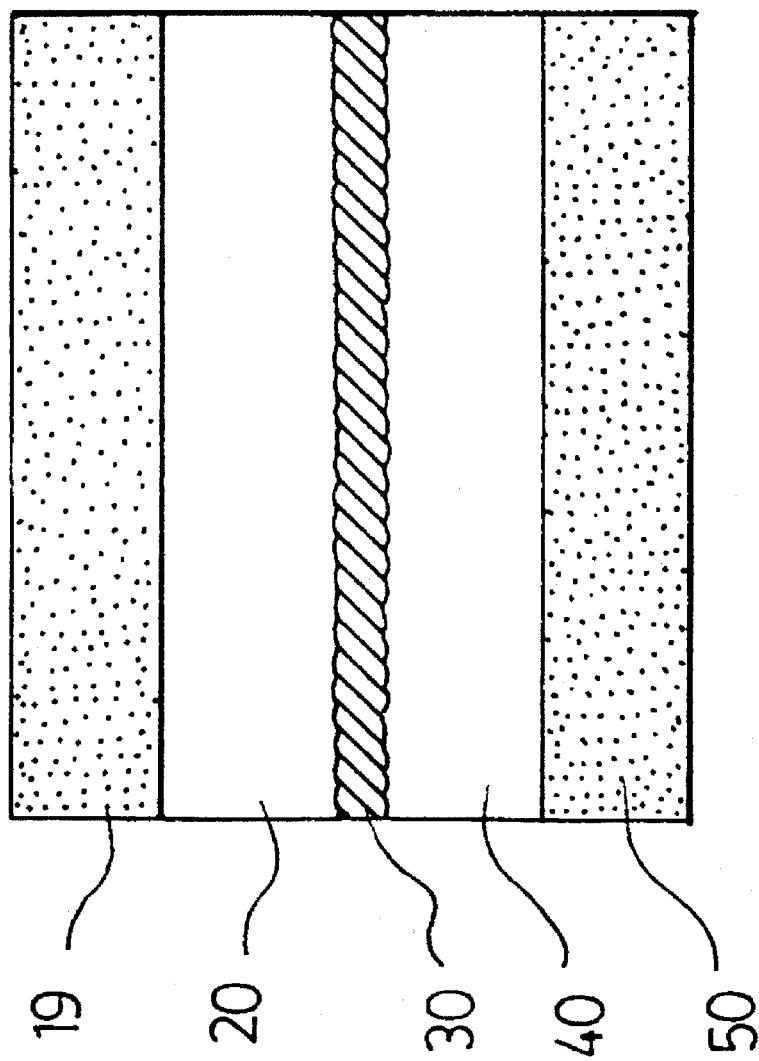
Figure 6:
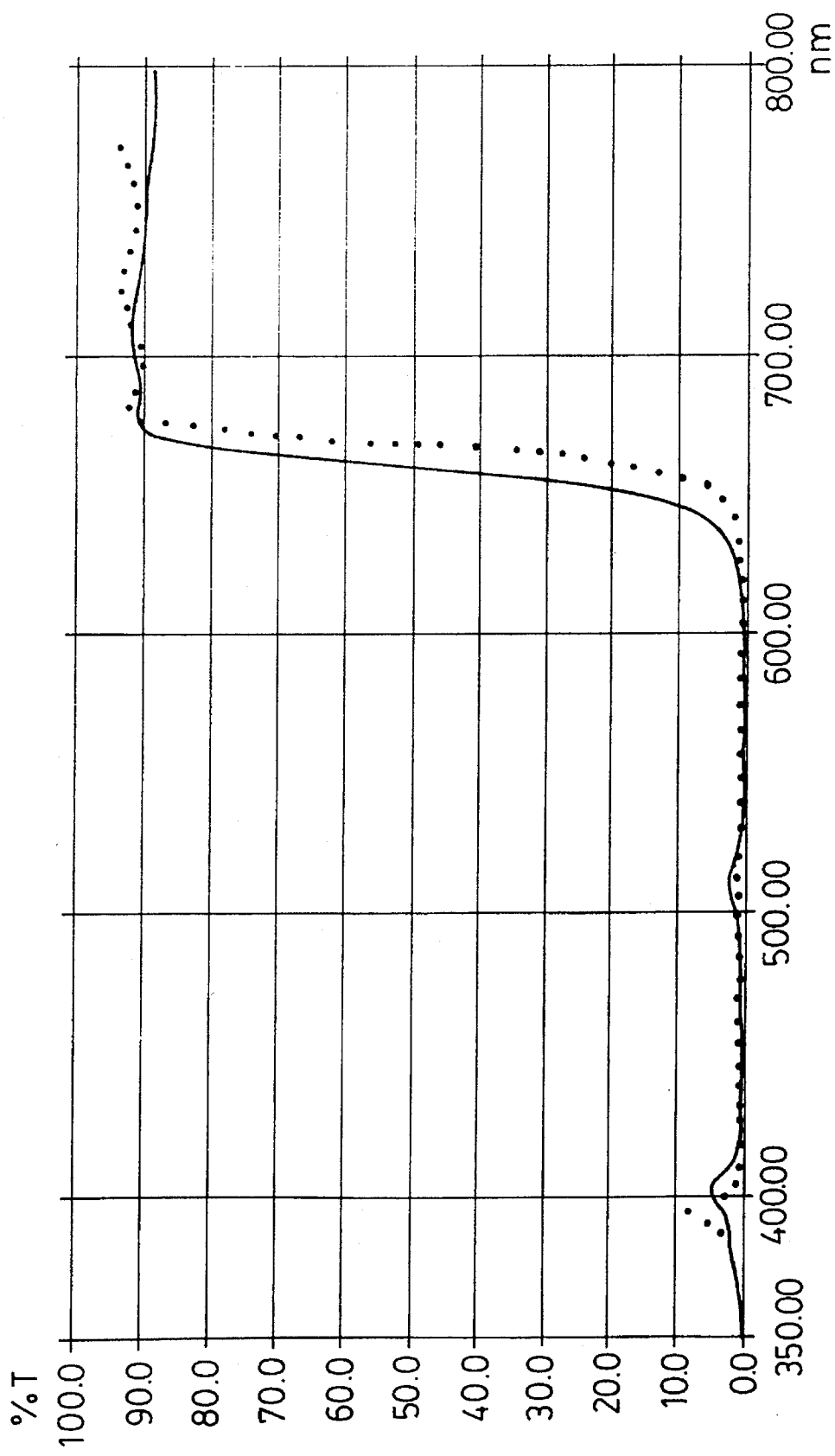
Figure 7:
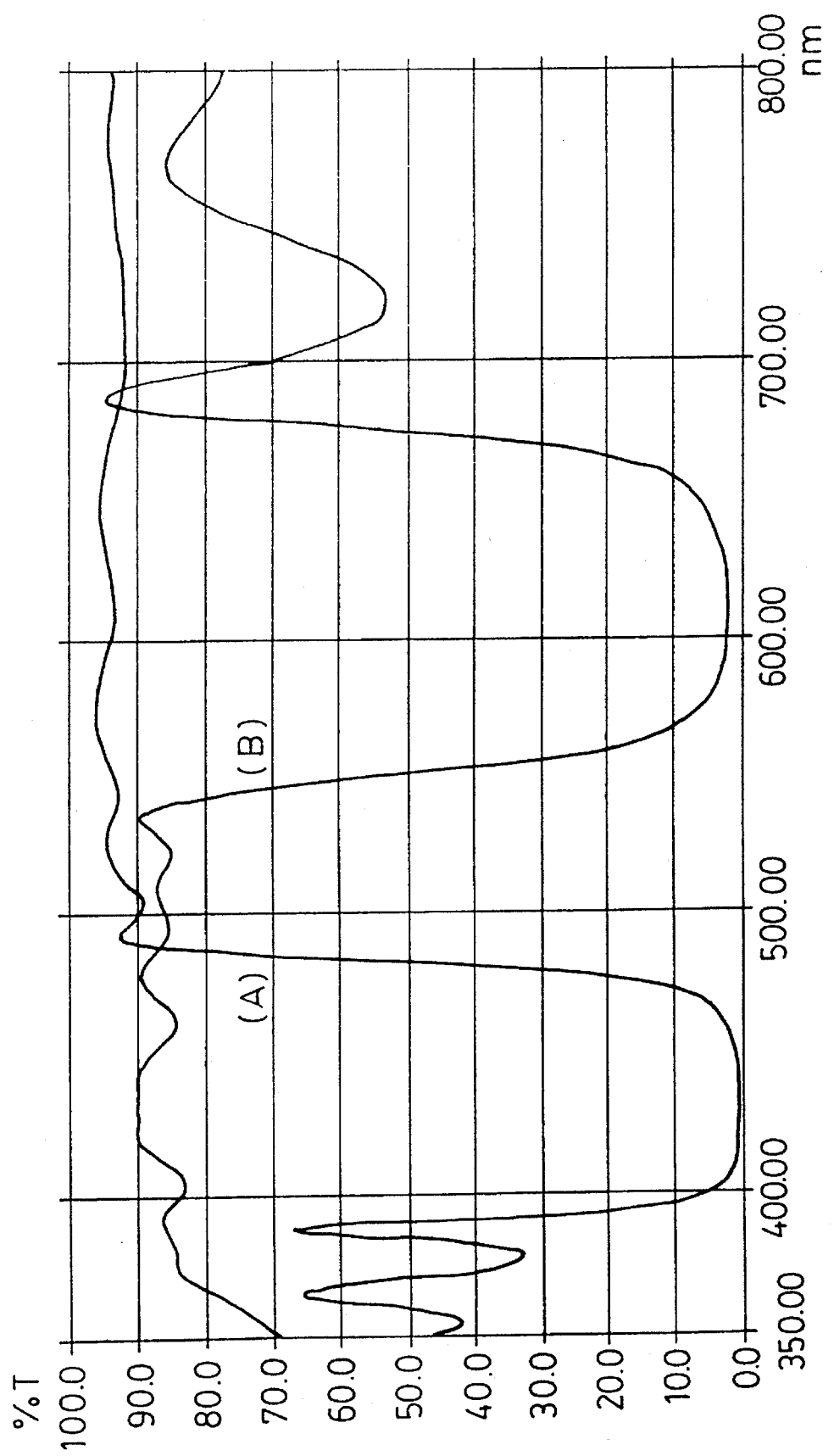
Figure 8:
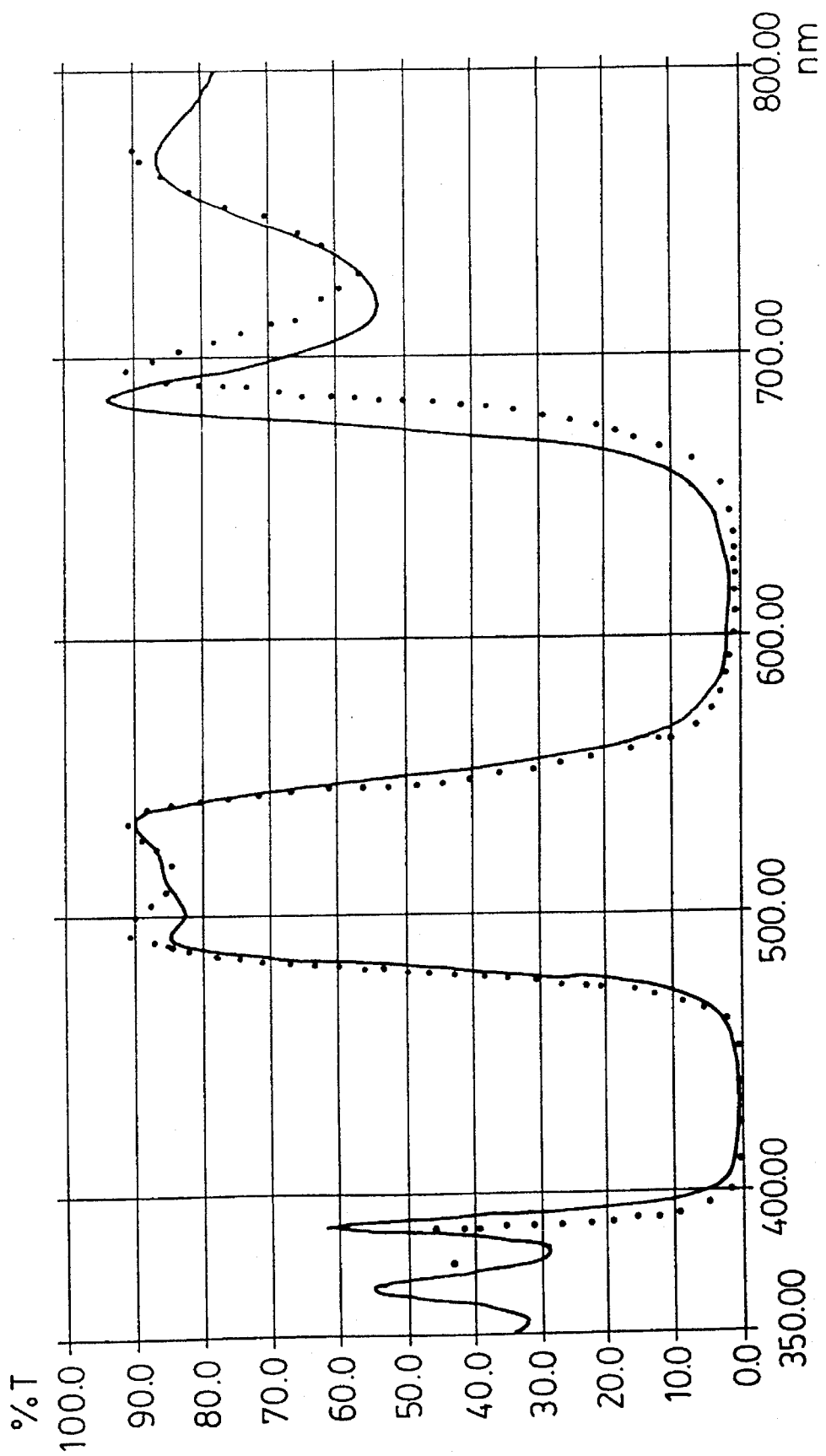
Figure 9:
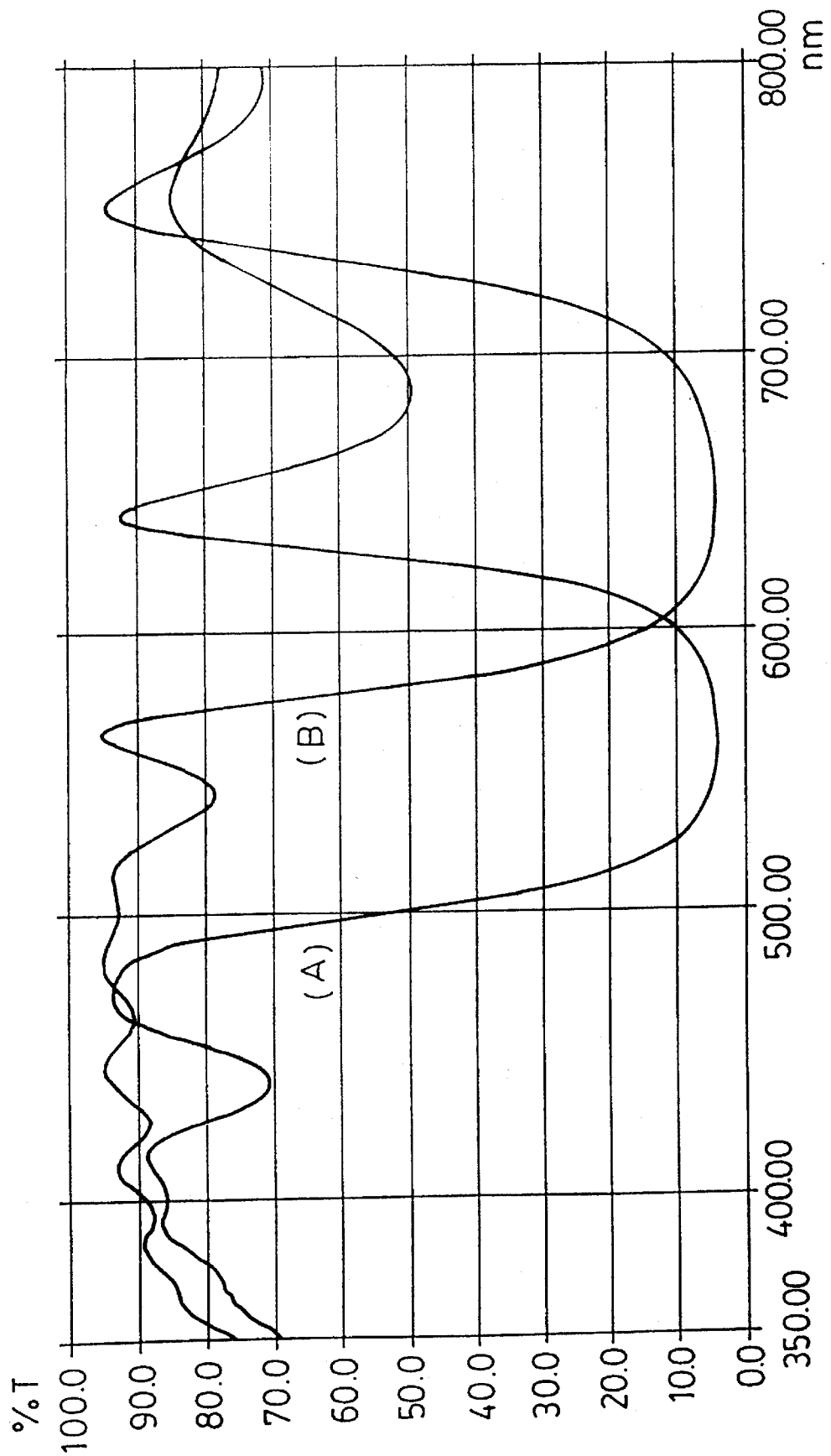
Figure 10:
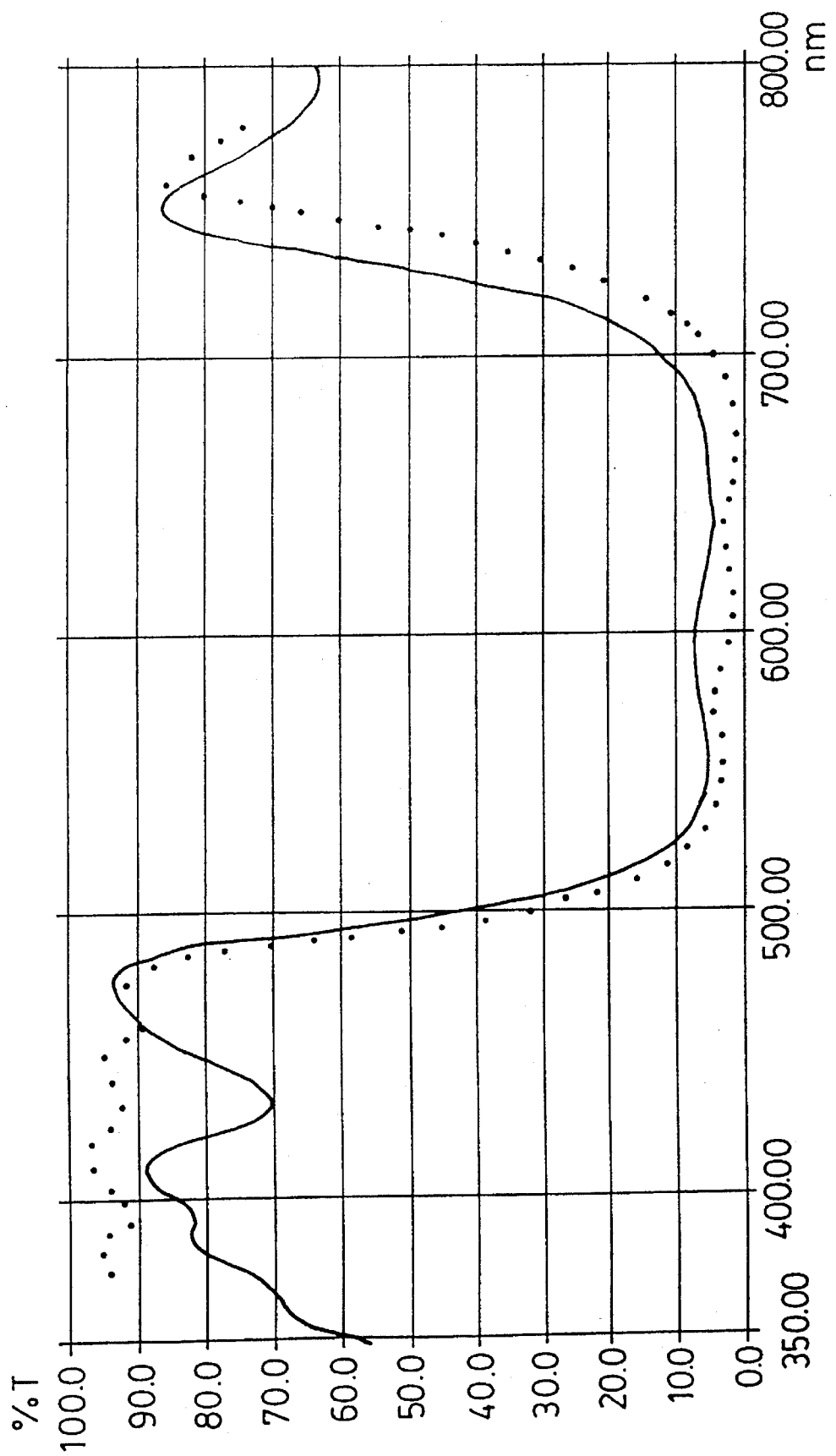
Figure 11:
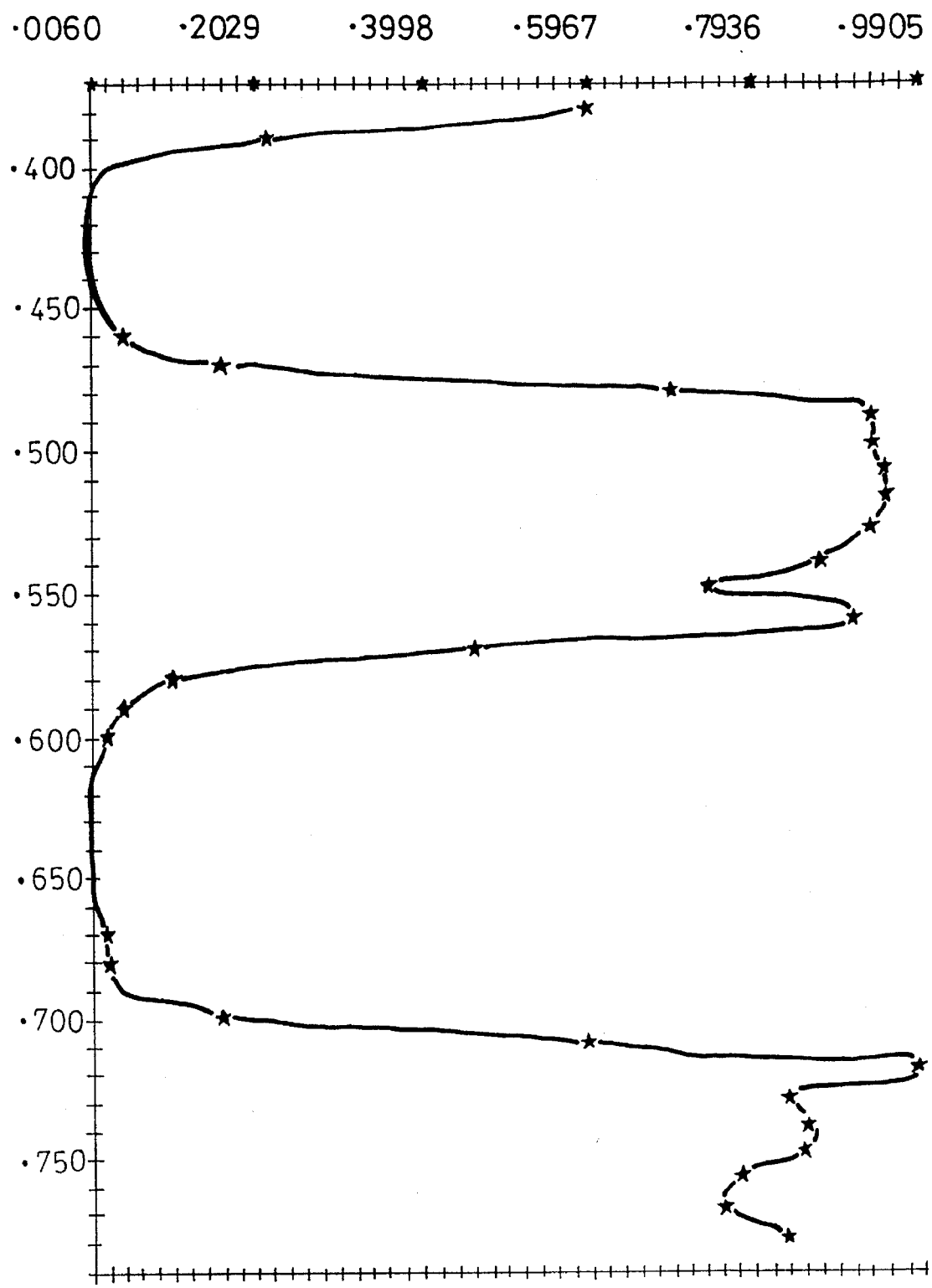

FIG. 1 is a spectrum pattern showing the results of experiments;

FIG. 2 is a spectrum pattern showing the results of the respective experiments in Table 2;

FIG. 3 is a spectrum pattern showing the results of the respective experiments in Table 3;

FIG. 4 is a spectrum pattern showing the respective two multilayer films for the exemplified red-color filter of the present invention;

FIG. 5 is a schematic view showing the structure of a preferred embodiment of the present invention;

FIG. 6 is a spectrum pattern showing the computer simulated and real finished products of the red-color filter comprising the two multilayer films which is exemplified in the present invention;

FIG. 7 is a spectrum pattern showing the respective two multilayer films for the exemplified green-color filter of the present invention;

FIG. 8 is a spectrum pattern showing the computer simulated and real finished products of the green-color filter comprising the two multilayer films which is exemplified in the present invention;

FIG. 9 is a spectrum pattern showing the respective two multilayer films for the exemplified blue-color filter of the present invention;

FIG. 10 is a spectrum pattern showing the computer simulated and real finished products of the blue-color filter comprising the two multilayer films which is exemplified in the present invention; and FIG. 11 is a spectrum pattern showing the computer simulated product of the green-color filter having one single substrate which is exemplified in the present invention.

Figure 12:
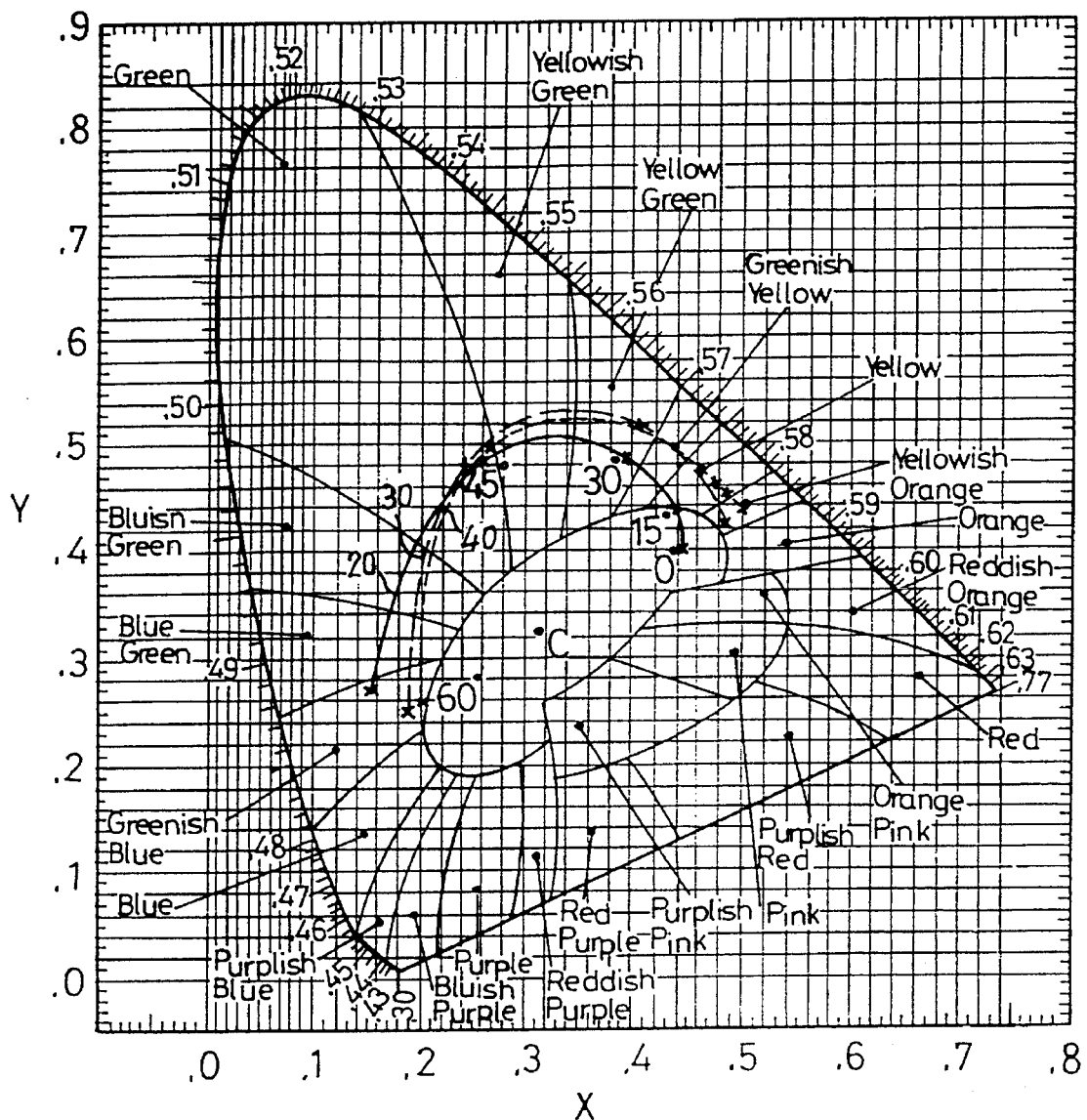

FIG. 12 is a diagram of chromaticity coordinate.

DETAILED DESCRIPTION OF THE INVENTION

The present invention provides a new color filter comprising a substrate on which two or more different multilayer films are deposited. In addition, the present invention relates to a method for preparing the color filter. The material used as the substrate should be transparent, such as glass or plastics. According to the present invention, the color filter is prepared by depositing two or more different multilayer films on a substrate based on the principle that each of the films can restrain visible light in certain ranges such that the light can not transmit therethrough. As each layer of the films provides a different filtering effect, the final transmitted light rays are the collections of the light rays transmitted through all multilayer films such that the desired color filters, such as filters for colors of red (R), green (G), blue (B), etc. are obtained.

The materials used in the present invention to form the multilayer films are amorphous silicon materials. The multilayer film comprises at least three layers of amorphous silicon materials. The layers of the multilayer films formed on the filter should be arranged in an alternate stacks manner of high and low refractive indices. This is because the more the difference in refractive index between adjacent layers of the films is, the more effective the reflection and interference are. Hence, the filters prepared according to the invention will have a better filtering effect.

The materials used in the present invention to form the films are amorphous silicon materials and the method used to deposit the films is the PECVD method. Using PECVD method to deposit amorphous materials is a method commonly used in the semiconductor industry but is used for the first time in the preparation of visible light filters. PECVD method comprises using an RF generator (AC, 13.56 MHz) to decompose a gas and depositing the gas on a substrate to form a film. When the gas is used up, the residue is pumped out and another gas is added. It is necessary to control the ratios and the flows of the gases (there is a pressure controller on the generator). With respect to the PECVD method, reference can be made to textbooks relating to deposition process for semiconductors. These techniques are well-known to those skilled in the art and are included herein for reference.

Among various amorphous materials, although a-Si:H (denoting an amorphous silicon material containing a large amount of hydrogen atoms) has a high refractive index (about 3.6), it also has high absorptivity in the visible light range, that is, light can hardly pass through, so that it can not be used in the invention. Therefore, the materials used in the present invention are amorphous silicon materials, such as a-SiOx, a-SiNx and a-SiCx.

Since PECVD method is used, by changing the vapor deposition conditions, such as ratios of the gas mixture and temperature for vapor deposition, different refractive indices may be obtained for the same material.

The preparation of the filter begins with the selections of materials. A study must be made prior to the selection of materials. The data in Tables 1, 2, and 3 were obtained in experiments by setting various parameters. It is known from Table 1 that the a-SiOx film having a refractive index of about 1.47 may be obtained in various growth times (e.g. 6, 9, and 12 minutes) at the temperature of 250° C. under the pressure of 0.3 Torr using a power of 6 watts, and having $SiH_4$ gas flow of 2 and $N_2O$ gas flow of 100. (It is apparent that the growth time of the film has no relation to the change of the refractive indices.) From Table 2, it is found that a-SiHx films having different refractive indices can be obtained by changing the flow of $SiH_4$ gas. From Table 3, it is known that a-SiHx films having different refractive indices can also be obtained by admixing $NH_3$ gas with $SiH_4$ gas to change the flow of $SiH_4$ gas. Therefore, it is noted from Tables 1, 2, and 3 that under what growth conditions, the selected film materials with the specific refractive indices can be obtained.

Further, by measuring various films under the growth conditions listed in Tables 2 and 3, spectrum patterns as shown in FIGS. 2 and 3 are obtained. By repeating the above measurement under the conditions similar to those listed in Table 1 provided that the composition ratios of $SiH_4$ to $N_2O$ are changed to be 5.0%, 3.3%, 2.5% and 2%, a spectrum pattern as shown in FIG. 1 is obtained. It is apparent from FIG. 1 that compositions of $SiH_4$ and $N_2O$ in different ratios have very similar wavelengths. It can be seen from FIG. 1 that a-SiOx film absorbs a very small amount of visible light and the light with wavelengths in all visible light ranges can pass through the film. Hence, the a-SiOx film is suitable for use in filters of various colors. Referring to FIG. 2, a-SiNx films obtained by using $SiH_4$ and $N_2$ absorb blue and green light rays under conditions b2, b3 and b4. Therefore, the a-SiNx films are not suitable for use in blue and green color filters. Referring to FIG. 3, the films prepared by using a gas mixture of $SiH_4$, $NH_3$, and $N_2$ in different ratios absorb the blue light ray under conditions c3 and c4 and hence, the conditions c3 and c4 are not useful in the preparation of blue color filters.

After selecting the materials (such as a-SiOx and a-SiNx), the structure of the filters is designed. Since the present invention primarily makes use of the interference between the multilayer films, two or more films are required. The thickness of each film is preferably less than the wavelength of the visible light. Otherwise, the film will act as the substrate (such as glass) and the interference phenomenon will not occur when the thickness of the film is larger than the wavelength.

Accordingly, the materials are properly selected, and then the structure of the desired filters is designed and subject to programmed simulation by a computer. The present invention makes use of "ITRI-FILM", a commercial software developed by the Industrial Technology Research Institute, 195 Chung Hsing Rd., Section 4, Chutung, Taiwan 31015, ROC (copyright pending) which is characterized by using the film interference principle and (computer) data analysis to optimize the original models. Alternatively, a software named "Film Star" from FIG Software Associate, U.S.A. may be used. Such computer program is well-known to persons having ordinary skill in optics. The principle used in these two softwares are similar. Although the functions of them are not exactly the same, similar results can be obtained. The application of computer programs is well known to those skilled in the art and will not be further described hereinafter. After the materials are selected, their refractive indices will be constant. Subsequently, the thickness and the number of the layers of the films are input to the program as the parameters. Simulation can be performed with the program by the try-and-error method for optimum results from which actual finished products can be made.

By using PECVD method, preliminary filters may be obtained by growing a film on a substrate according to the program simulated results. The spectra of the filters are measured and compared with the values of the computer simulation. If the difference between the value measured actually and simulation value is too large, the parameters for growing the films will be corrected until expected filters are made.

During the stage of material selection, to obtain a proper material, the parameters for growing the films, the properties of the materials, such as absorptivity, permeability, refractive index, and stability of the materials must be taken into consideration It is not easy to select the materials having high refractive indices. This is due to the fact that the materials must have both the high refractive index and the low absorptivity. To select the material having a high refractive index, growth conditions, the properties of the materials and the growth parameters should properly be considered.

Since the present invention uses amorphous silicon materials as the materials for films, color filters prepared according to the present invention can have a more compact texture and a better weather resistance and can be used normally in a worse environment.

Moreover, the present invention using PECVD method to prepare color filters is unknown in the art and the color filters and the filter prepared by PECVD method is also novel. The color filters according to the present invention are successfully prepared and fit for practical use.

Further, as the color filters of the present invention were prepared by PECVD method, the method is faster, easier and more effective than conventional deposition methods.

In addition, in the method of the present invention, when the composition of films are to be changed, it is necessary only to change the gases or adjust the gas flow ratio without additional formulation or change of the target materials. Thus, the time for preparing the filters is greatly reduced.

Also, another advantage of using the PECVD method was tin the preparation of the color filters according to the present invention is to carry out the method at a more reasonable temperature but not at an excessive high temperature.

Furthermore, the growth conditions for the films shown in Tables 1, 2, and 3 can be established in advance such that the thickness of the films obtainable under various growth conditions can be predicted, and thus the thickness of the films can be controlled without using expensive film controlling monitors.

The following examples are offered by way of illustration. The examples are not intended to limit the scope of the invention in any respect and should not be so construed.

EXAMPLE 1: (preparation of red color filters)

a-SiOx having a refractive index of 1.47 (preparation conditions can be obtained from Table 1) and a-SiNx having a refractive index of 2.32 (preparation conditions can be obtained from Table 2 and better results were obtained because of its higher refractive index) were selected as the materials for the films. The design of the filters was simulated by means of the computer program and results were obtained as shown in Tables 4 and 5. The films obtained were referred to as multilayer films A and B respectively. It can be seen from Table 4 that multilayer film A having 17 layers (see LAYER NUMBER COLUMN) was formed on a substrate (SUBST, refractive index 1.47), wherein layer 1 was a-SiNx layer (refractive index 2.2); layer 2 was a-SiOx layer (refractive index 1.47); layer 3 was a-SiNx layer; layer 4 was a-SiOx layer; . . . ; and layer 17 was a-SiNx layer. Again, it can be seen from Table 5 that multilayer film B having 21 layers was formed on a substrate (SUBST, refractive index 1.52), wherein layer 1 was a-SiNx layer (refractive index 2.14); layer 2 was a-SiOx layer (refractive index 1.47); layer 3 was a-SiNx layer; layer 4 was a-SiOx layer; . . . ; and layer 21 was a-SiNx layer.

Glass (Corning 7059 glass) having a refractive index of 1.52 was selected as the substrate for growing multilayer films A and B respectively by means of PECVD method according to the computer simulation results. The spectrum pattern of both films was shown in FIG. 4. It can be seen from FIG. 4 that multilayer film B has a higher absorptivity than multilayer film A in the visible light ranges. A visible optical cement was used to bond together the substrates (glass) on which multilayer films A and B are grown respectively. Because the cement had the same refractive index as glass, the results were not affected. The structure was shown in FIG. 5 wherein 10 represented multilayer film A; 50 represented multilayer film B; 20 and 40 represented the two substrates; and 30 represented the cement. When the two films overlapped each other, the effect was the result obtained by multiplying the spectral permeabilities of the two multilayer films together. This result was shown in FIG. 6. In FIG. 6, the result from the computer simulation was shown in dots and the actual result obtained in experiments was shown in solid line. The finished filters permitted only red light to pass through but absorbed light rays of other colors.

EXAMPLE 2 (preparation of green and blue color filters)

a-SiOx having a refractive index of 1.47 (preparation conditions may be obtained from Table 1) and a-SiNx (preparation conditions may be obtained from Table 3) were selected as the materials for the films. It is noted from FIG. 3 that the conditions c3 and c4 are not useful in the preparation of blue and green color filters. The preparation condition c2 was used instead of conditions c3 and c4 to conduct the deposition of a-SiHx film.

The design of the filters was simulated by means of the computer program and results were obtained as shown in Tables 6 and 7. The films obtained are referred to as multilayer films A and B respectively. It can be seen from Table 6 that multilayer film A containing 13 layers were deposited on a substrate (SUBST, refractive index 1.52), wherein layer 1 was a-SiNx layer (refractive index 1.927); layer 2 was a-SiOx layer (refractive index 1.47); layer 3 was a-SiNx layer; layer 4 was a-SiOx layer; . . . ; and layer 13 was a-SiNx layer. Again, It can be seen from Table 7 that multilayer film B containing 21 layers were deposited on a substrate, layer 1 was a-SiOx layer (refractive index 1.47); layer 2 was a-SiNx layer (refractive index 1.927); layer 3 was a-SiNx layer; layer 4 was a-SiOx layer; . . . ; and layer 21 was a-SiNx layer.

Multilayer films A and B were deposited respectively on the glass substrates by means of the PECVD method according to the computer simulated results. The spectrum pattern of both films was shown in FIG. 7. It can be seen from FIG. 7 that multilayer film A and multilayer film B each has a different absorption region in the visible light ranges, but their overlapped portions (in which both films will not absorb light) were in the green light region. Therefore, they can be used as green color filters. Besides, an optical cement was used to bond together the substrates on which multilayer films A and B were deposited. The structure was also similar to that shown in FIG. 5. The result can be seen from FIG. 8. In FIG. 8, the result from the computer simulation was shown in dots and the actual result obtained in experiments was shown in solid line. The finished filters permitted only green light to pass through but absorbed light rays of other colors.

In a similar manner, Tables 8 and 9 were obtained by using a-SiOx and a-SiNx as the materials for films. The spectrum pattern of multilayer film A and multilayer film B was derived by measuring Tables 8 and 9 and was shown in FIG. 9. Bonding together the substrates on which multilayer films A and B were formed, a blue color filter whose spectrum pattern was shown in FIG. 10 was obtained.

The red, green and blue color filters obtained in the above were measured to obtain the color analytic value for the red filter: $(x,y)=(0.5979, 0.0361)$; the value for the green filter: $(x,y)=(0.1786, 0.5749)$; and the value for the blue filter: $(x,y)=(0.1603, 0.1105)$. Referring to FIG. 12, there were chromaticity coordinate values obtained by using a standard light source C. As all the coordinates of the red, green, and blue filters thus obtained were in their respective color regions, it is apparent that the present invention has feasibility.

EXAMPLE 3 (preparation of green color filters on single substrate)

In the above examples, two substrates on one side of which multilayer films were formed were bonded together by a visible optical cement to obtain the color filters. However, this method enabled the manufacturers to readily select the substrates on which films were deposited in excellent condition from a plurality of substrates on only one side of which the multilayer films were deposited. If the films were deposited on both sides of the substrates, the cement is not necessary but the films formed on both sides of the substrate should both be in excellent condition. Thus, this method avoided rejecting the substrates failing in deposition of the film on only one side of the substrates and reduced the rejection rate.

The present invention was in fact not limited to the filters having two substrates bonded together. Referring to Table 10, 46 layers of films were deposited on a single substrate with a-SiOx having a refractive index of 1.47 and a-SiNx having a refractive index of 1.927 deposited in alternate sequence, wherein layer 1 was a-SiOx layer; layer 2 was a-SiNx layer; and so on. Besides, the resultant data are indicated as follows:

| transmittance | wavelength |
|---|---|
| .6084 | .380 |
| .2290 | .390 |
| .0247 | .400 |

-continued

| transmittance | wavelength |
|---|---|
| .0106 | .410 |
| .0060 | .420 |
| .0089 | .430 |
| .0081 | .440 |
| .0242 | .450 |
| .0479 | .460 |
| .1692 | .470 |
| .7014 | .480 |
| .9324 | .490 |
| .9467 | .500 |
| .9520 | .510 |
| .9676 | .520 |
| .9402 | .530 |
| .8759 | .540 |
| .7482 | .550 |
| .9312 | .560 |
| .4617 | 570 |
| .1177 | .580 |
| .0595 | .590 |
| .0299 | .600 |
| .0135 | .610 |
| .0082 | .620 |
| .0074 | .630 |
| .0097 | .640 |
| .0162 | .650 |
| .0252 | .660 |
| .0302 | .670 |
| .0378 | .680 |
| .0647 | .690 |
| .1689 | .700 |
| .6085 | .710 |
| .9905 | .720 |
| .8473 | .730 |
| .8695 | .740 |
| .8664 | .750 |
| .7780 | .760 |
| .7588 | .770 |
| .8496 | .780 |

The spectrum pattern thus obtained was shown in FIG. 11. It can be seen form FIG. 11 that the filters thus prepared permitted green light to pass through and filtered out the light of other colors. Therefore, this provides a good green filter comprising a single substrate.

While the embodiments of the present invention have been described, it was to be appreciated that the present invention was not limited thereto. Various modifications can be made by those skilled in the art without departing from the spirit and features thereof. For example, the number of the layers of the films can be varied and other amorphous silicon materials suitable for visible light may be alternatively used. Therefore, it was intended that all such modifications were within the scope of the present invention, and the true scope thereof was as set forth in the appended Claims.

TABLE 1

| | Temp (°C.) | Power (W) | Pressure (Torr) | Gas Flow Rate SiH$_4$ | Gas Flow Rate N$_2$O | Time (min) | Growth Rate A°/min | Index |
|---|---|---|---|---|---|---|---|---|
| a1 | 250 | 6 | 0.3 | 2 | 100 | 6 | 95 | 1.473 |
| a2 | 250 | 6 | 0.3 | 2 | 100 | 9 | 78 | 1.477 |
| a3 | 250 | 6 | 0.3 | 2 | 100 | 12 | 84 | 1.469 |

TABLE 2

|    | Temp (°C.) | Power (W) | Pressure (Torr) | Gas Flow Rate (sccm) SiH₄ | NH₃ | N₂ | Time (min) | Index |
|----|------|-----|-----|-----|-----|-----|----|------|
| b1 | 250  | 100 | 0.5 | 2   |     | 100 | 40 | 2.02 |
| b2 | 250  | 100 | 0.5 | 2.5 |     | 100 | 40 | 2.3  |
| b3 | 250  | 100 | 0.5 | 3   |     | 100 | 40 | 2.31 |
| b4 | 250  | 100 | 0.5 | 3.5 |     | 100 | 40 | 2.38 |

TABLE 3

|    | Temp (°C.) | Power (W) | Pressure (Torr) | Gas Flow Rate (sccm) SiH₄ | NH₃ | N₂ | Time (min) | Index |
|----|------|-----|-----|-----|-----|-----|----|-------|
| c1 | 250  | 100 | 0.5 | 2   | 1.5 | 100 | 40 | 1.817 |
| c2 | 250  | 100 | 0.5 | 2.5 | 1.5 | 100 | 30 | 1.927 |
| c3 | 250  | 100 | 0.5 | 3   | 1.5 | 100 | 30 | 2.0   |
| c4 | 250  | 100 | 0.5 | 3.5 | 1.5 | 100 | 40 | 2.278 |

TABLE 4

Red-color Filter - A
ANALYSIS OF ABSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .6000 | 1.0000 | .0000 | .7800 | 1.0000 | .0000 |
| 2 | .3800 | 2.3360 | .0013 | .6000 | 2.3120 | .0000 | .7800 | 2.2840 | .0000 |
| 3 | .3800 | 2.2820 | .0478 | .6000 | 2.2000 | .0000 | .7800 | 2.0940 | .0000 |
| 4 | .3800 | 1.5200 | .0000 | .6000 | 1.5200 | .0000 | .7800 | 1.5200 | .0000 |
| 5 | .3800 | 1.4760 | .0001 | .6000 | 1.4700 | .0000 | .7800 | 1.5200 | .0000 |
| 6 | .3800 | 2.2210 | .0000 | .6000 | 2.1000 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 |       | 1.5200 | .0000E+00 |
| 1  | .02600 | .0572 | 2.2000 | .0000E+00 |
| 2  | .07782 | .1144 | 1.4700 | .0000E+00 |
| 3  | .05200 | .1144 | 2.2000 | .0000E+00 |
| 4  | .07782 | .1144 | 1.4700 | .0000E+00 |
| 5  | .05200 | .1144 | 2.2000 | .0000E+00 |
| 6  | .07782 | .1144 | 1.4700 | .0000E+00 |
| 7  | .05200 | .1144 | 2.2000 | .0000E+00 |
| 8  | .07782 | .1144 | 1.4700 | .0000E+00 |
| 9  | .05200 | .1144 | 2.2000 | .0000E+00 |
| 10 | .07782 | .1144 | 1.4700 | .0000E+00 |
| 11 | .05200 | .1144 | 2.2000 | .0000E+00 |
| 12 | .07782 | .1144 | 1.4700 | .0000E+00 |
| 13 | .05200 | .1144 | 2.2000 | .0000E+00 |
| 14 | .07782 | .1144 | 1.4700 | .0000E+00 |
| 15 | .05200 | .1144 | 2.2000 | .0000E+00 |
| 16 | .07782 | .1144 | 1.4700 | .0000E+00 |
| 17 | .02600 | .0572 | 2.2000 | .0000E+00 |
| MED(MM) | .00000 |   | 1.0000 | .0000E+00 |

ANGLE OF INCIDENCE = .00 DEG. PARALLEL POL.

TABLE 5

Red-color Filter - B
ANALYSIS OF ASSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .6000 | 1.0000 | .0000 | .7800 | 1.0000 | .0000 |
| 2 | .3800 | 2.3360 | .0013 | .6000 | 2.3120 | .0000 | .7800 | 2.2840 | .0000 |
| 3 | .3800 | 2.2700 | .0448 | .6000 | 2.1400 | .0001 | .7800 | 2.0880 | .0000 |
| 4 | .3840 | 1.5200 | .0000 | .6000 | 1.5200 | .0000 | .7800 | 1.5200 | .0000 |
| 5 | .3800 | 1.4760 | .0001 | .6000 | 1.4700 | .0000 | .7800 | 1.4678 | .0000 |

TABLE 5-continued

Red-color Filter - B
ANALYSIS OF ASSORBING SYSTEM
N AND K VALUES AT 3 WAVELENGTHS OF SYSTEM MATERIALS

| | | | | | | | | | |
|---|---|---|---|---|---|---|---|---|---|
| 6 | .3800 | 2.2210 | .0000 | .6000 | 2.1000 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 | | 1.5200 | .0000E+00 |
| 1 | .03402 | .0728 | 2.1400 | .0000E−03 |
| 2 | .09912 | .1457 | 1.4700 | .0000E+00 |
| 3 | .06808 | .1457 | 2.1400 | .0000E−03 |
| 4 | .09912 | .1457 | 1.4700 | .0000E+00 |
| 5 | .06808 | .1457 | 2.1400 | .0000E−03 |
| 6 | .09912 | .1457 | 1.4700 | .0000E+00 |
| 7 | .06808 | .1457 | 2.1400 | .0000E−03 |
| 8 | .09912 | .1457 | 1.4700 | .0000E+00 |
| 9 | .06808 | .1457 | 2.1400 | .0000E−03 |
| 10 | .09912 | .1457 | 1.4700 | .0000E+00 |
| 11 | .06808 | .1457 | 2.1400 | .0000E−03 |
| 12 | .09912 | .1457 | 1.4700 | .0000E+00 |
| 13 | .06808 | .1457 | 2.1400 | .0000E−03 |
| 14 | .09912 | .1457 | 1.4700 | .0000E+00 |
| 15 | .06808 | .1457 | 2.1400 | .0000E−03 |
| 16 | .09912 | .1457 | 1.4700 | .0000E+00 |
| 17 | .06808 | .1457 | 2.1400 | .0000E−03 |
| 18 | .09912 | .1457 | 1.4700 | .0000E+00 |
| 19 | .06808 | .1457 | 2.1400 | .1000E−03 |
| 20 | .09912 | .1457 | 1.4700 | .0000E+00 |
| 21 | .03402 | .0728 | 2.1400 | .1000E−03 |
| MED(MM) | .00000 | | 1.0000 | .0000E+00 |

TABLE 6

Green-color Filter - A
ANALYSIS OF ASSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .6000 | 1.0000 | .0000 | .7800 | 1.0000 | .0000 |
| 2 | .3800 | 2.1240 | .0014 | .6000 | 2.1300 | .0000 | .7800 | 2.1120 | .0000 |
| 3 | .3800 | 1.9420 | .0008 | .6000 | 1.9270 | .0001 | .7800 | 1.9262 | .0001 |
| 4 | .3840 | 1.5200 | .0000 | .6000 | 1.5200 | .0000 | .7800 | 1.5200 | .0000 |
| 5 | .3800 | 1.4760 | .0001 | .6000 | 1.4700 | .0000 | .7800 | 1.4678 | .0000 |
| 6 | .3800 | 2.2210 | .0000 | .6000 | 2.1000 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 | | 1.5200 | .0000E+00 |
| 1 | .02802 | .0540 | 1.9270 | .1000E−03 |
| 2 | .07347 | .1080 | 1.4700 | .0000E+00 |
| 3 | .05605 | .1080 | 1.9270 | .1000E−03 |
| 4 | .07347 | .1080 | 1.4700 | .0000E+00 |
| 5 | .05605 | .1080 | 1.9270 | .1000E−03 |
| 6 | .07347 | .1080 | 1.4700 | .0000E+00 |
| 7 | .05605 | .1080 | 1.9270 | .1000E−03 |
| 8 | .07347 | .1080 | 1.4700 | .0000E+00 |
| 9 | .05605 | .1080 | 1.9270 | .1000E−03 |
| 10 | .07347 | .1080 | 1.4700 | .0000E+00 |
| 11 | .05605 | .1080 | 1.9270 | .1000E−03 |
| 12 | .07347 | .1080 | 1.4700 | .0000E+00 |
| 13 | .05605 | .1080 | 1.9270 | .1000E−03 |
| 14 | .07347 | .1080 | 1.4700 | .0000E+00 |
| 15 | .05605 | .1080 | 1.9270 | .1000E−03 |
| 16 | .07347 | .1080 | 1.4700 | .0000E+00 |
| 17 | .05605 | .1080 | 1.9270 | .1000E−03 |
| 18 | .07347 | .1080 | 1.4700 | .0000E+00 |
| 19 | .05605 | .1080 | 1.9270 | .1000E−03 |

TABLE 6-continued

Green-color Filter - A
ANALYSIS OF ABSORBING SYSTEM
N AND K VALUES AT 3 WAVELENGTHS OF SYSTEM MATERIALS

| | | | | |
|---|---|---|---|---|
| 20 | .07347 | .1080 | 1.4700 | .0000E+00 |
| 21 | .05605 | .1080 | 1.9270 | .1000E−03 |
| 22 | .07347 | .1080 | 1.4700 | .0000E+00 |
| 23 | .02802 | .0540 | 1.9270 | .1000E−03 |

TABLE 7

Green-color Filter - B
ANALYSIS OF ABSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .6000 | 1.0000 | .0000 | .7800 | 1.0000 | .0000 |
| 2 | .3800 | 2.1840 | .0014 | .6000 | 2.1300 | .0000 | .7800 | 2.1120 | .0000 |
| 3 | .3800 | 1.9320 | .0005 | .6000 | 1.9270 | .0001 | .7800 | 1.9262 | .0001 |
| 4 | .3840 | 1.5200 | .0000 | .6000 | 1.5200 | .0000 | .7800 | 1.5200 | .0000 |
| 5 | .3800 | 1.4760 | .0001 | .6000 | 1.4700 | .0000 | .7800 | 1.4678 | .0000 |
| 6 | .3800 | 2.2210 | .0000 | .6000 | 2.1000 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 | | 1.5200 | .0000E+00 |
| 1 | .05129 | .0754 | 1.4700 | .0000E+00 |
| 2 | .07826 | .1508 | 1.9270 | .0000E−03 |
| 3 | .10259 | .1508 | 1.4700 | .0000E+00 |
| 4 | .07826 | .1508 | 1.9270 | .0000E−03 |
| 5 | .10259 | .1508 | 1.4700 | .0000E+00 |
| 6 | .07826 | .1508 | 1.9270 | .0000E−03 |
| 7 | .10259 | .1508 | 1.4700 | .0000E+00 |
| 8 | .07826 | .1508 | 1.9270 | .0000E−03 |
| 9 | .10259 | .1508 | 1.4700 | .0000E+00 |
| 10 | .07826 | .1508 | 1.9270 | .0000E−03 |
| 11 | .10259 | .1508 | 1.4700 | .0000E+00 |
| 12 | .07826 | .1508 | 1.9270 | .0000E−03 |
| 13 | .10259 | .1508 | 1.4700 | .0000E+00 |
| 14 | .07826 | .1508 | 1.9270 | .0000E−03 |
| 15 | .10259 | .1508 | 1.4700 | .0000E+00 |
| 16 | .07826 | .1508 | 1.9270 | .0000E−03 |
| 17 | .10259 | .1508 | 1.4700 | .0000E+00 |
| 18 | .07826 | .1508 | 1.9270 | .0000E−03 |
| 19 | .10259 | .1508 | 1.4700 | .1000E+00 |
| 20 | .07826 | .1508 | 1.9270 | .0000E−03 |
| 21 | .05129 | .0754 | 1.4700 | .1000E+00 |
| MED(MM) | .00000 | | 1.0000 | .0000E+00 |

ANGLE OF INCIDENCE = .00 DEG. PARALLEL POL.

TABLE 8

Blue-color Filter - A
ANALYSIS OF ABSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .5600 | 1.0000 | .0000 | .7800 | 1.0000 | .0000 |
| 2 | .3800 | 2.1842 | .0014 | .5600 | 2.1340 | .0000 | .7800 | 2.1120 | .0000 |
| 3 | .3800 | 1.9362 | .0005 | .5600 | 1.9278 | .0001 | .7800 | 1.9362 | .0000 |
| 4 | .3840 | 1.5200 | .0000 | .5600 | 1.5200 | .0000 | .7800 | 1.5200 | .0000 |
| 5 | .3800 | 1.4760 | .0001 | .5600 | 1.4710 | .0000 | .7800 | 1.4678 | .0000 |
| 6 | .3800 | 2.2210 | .0000 | .5600 | 2.1220 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 | | 1.5200 | .0000E+00 |

TABLE 8-continued

Blue-color Filter - A
ANALYSIS OF ABSORBING SYSTEM
N AND K VALUES AT 3 WAVELENGTHS OF SYSTEM MATERIALS

| | | | | |
|---|---|---|---|---|
| 1 | .05520 | .0812 | 1.4710 | .0000E+00 |
| 2 | .08419 | .1623 | 1.9278 | .0000E−04 |
| 3 | .11033 | .1623 | 1.4710 | .0000E+00 |
| 4 | .08419 | .1623 | 1.9278 | .0000E−04 |
| 5 | .11033 | .1623 | 1.4710 | .0000E+00 |
| 6 | .08419 | .1623 | 1.9278 | .0000E−04 |
| 7 | .11033 | .1623 | 1.4710 | .0000E+00 |
| 8 | .08419 | .1623 | 1.9278 | .0000E−04 |
| 9 | .11033 | .1623 | 1.4710 | .0000E+00 |
| 10 | .08419 | .1623 | 1.9278 | .0000E−04 |
| 11 | .11033 | .1623 | 1.4710 | .0000E+00 |
| 12 | .08419 | .1623 | 1.9278 | .0000E−04 |
| 13 | .11033 | .1623 | 1.4710 | .0000E+00 |
| 14 | .08419 | .1623 | 1.9278 | .0000E−04 |
| 15 | .11033 | .1623 | 1.4710 | .0000E+00 |
| 16 | .08419 | .1623 | 1.9278 | .0000E−04 |
| 17 | .05520 | .0812 | 1.4710 | .0000E+00 |
| MED(MM) | .00000 | | 1.0000 | .0000E+00 |

ANGLE OF INCIDENCE = .00 DEG. PARALLEL POL.

TABLE 9

Blue-color Filter - B
ANALYSIS OF ABSORBING SYSTEM
N AND K VALUES AT 3 WAVELENGTHS OF SYSTEM MATERIALS

| No. | WAVEL. | N | K | WAVEL. | N | K | WAVEL. | N | K |
|---|---|---|---|---|---|---|---|---|---|
| 1 | .3800 | 1.0000 | .0000 | .5600 | 1.0000 | .0000 | .7800 | 1.0000 | .0000 |
| 2 | .3800 | 2.1840 | .0014 | .5600 | 2.1340 | .0000 | .7800 | 2.1120 | .0000 |
| 3 | .3800 | 1.9362 | .0005 | .5600 | 1.9278 | .0001 | .7800 | 1.9262 | .0000 |
| 4 | .3840 | 1.5200 | .0000 | .5600 | 1.5200 | .0000 | .7800 | 1.5200 | .0000 |
| 5 | .3800 | 1.4760 | .0001 | .5600 | 1.4710 | .0000 | .7800 | 1.4678 | .0000 |
| 6 | .3800 | 2.2210 | .0000 | .5600 | 2.1220 | .0000 | .7800 | 2.0775 | .0000 |

THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .6000 MU-M |
|---|---|---|---|---|
| SUBST(MM) | .00000 | | 1.5200 | .0000E+00 |
| 1 | .04623 | .0680 | 1.4710 | .0000E+00 |
| 2 | .07101 | .1369 | 1.9278 | .0000E−04 |
| 3 | .09307 | .1369 | 1.4710 | .0000E+00 |
| 4 | .07101 | .1369 | 1.9278 | .0000E−04 |
| 5 | .09307 | .1369 | 1.4710 | .0000E+00 |
| 6 | .07101 | .1369 | 1.9278 | .0000E−04 |
| 7 | .09307 | .1369 | 1.4710 | .0000E+00 |
| 8 | .07101 | .1369 | 1.9278 | .0000E−04 |
| 9 | .09307 | .1369 | 1.4710 | .0000E+00 |
| 10 | .07101 | .1369 | 1.9278 | .0000E−04 |
| 11 | .09307 | .1369 | 1.4710 | .0000E+00 |
| 12 | .07101 | .1369 | 1.9278 | .0000E−04 |
| 13 | .09307 | .1369 | 1.4710 | .0000E+00 |
| 14 | .07101 | .1369 | 1.9278 | .0000E−04 |
| 15 | .09307 | .1369 | 1.4710 | .0000E+00 |
| 16 | .07101 | .1369 | 1.9278 | .0000E−04 |
| 17 | .04623 | .0680 | 1.4710 | .0000E+00 |
| MED(MM) | .00000 | | 1.0000 | .0000E+00 |

ANGLE OF INCIDENCE = .00 DEG. PARALLEL POL.

TABLE 10

Green-color Filter - A
ANALYSIS OF ABSORBING SYSTEM
THE LAYER SYSTEM:

| LAYER NUMBER | METRIC THICKNESS (IN MU-M) | OPTIC THICKNESS (IN MU-M) | REFRACTIVE INDEX AT | ABSORPTION COEFFICIENT .5000 MU-M |
| --- | --- | --- | --- | --- |
| SUBST(MM) | .00000 | | 1.5200 | .0000E+00 |
| 1 | .05374 | .0790 | 1.4700 | .0000E+00 |
| 2 | .08199 | .1580 | 1.9270 | .0000E+00 |
| 3 | .10746 | .1580 | 1.4700 | .0000E+00 |
| 4 | .08199 | .1580 | 1.9270 | .0000E+00 |
| 5 | .10748 | .1580 | 1.4700 | .0000E+00 |
| 6 | .08199 | .1580 | 1.9270 | .0000E+00 |
| 7 | .10748 | .1580 | 1.4700 | .0000E+00 |
| 8 | .08199 | .1580 | 1.9270 | .0000E+00 |
| 9 | .10748 | .1580 | 1.4700 | .0000E+00 |
| 10 | .08199 | .1580 | 1.9270 | .0000E+00 |
| 11 | .10748 | .1580 | 1.4700 | .0000E+00 |
| 12 | .08199 | .1580 | 1.9270 | .0000E+00 |
| 13 | .10748 | .1580 | 1.4700 | .0000E+00 |
| 14 | .08199 | .1580 | 1.9270 | .0000E+00 |
| 15 | .10748 | .1580 | 1.4700 | .0000E+00 |
| 16 | .08199 | .1580 | 1.9270 | .0000E+00 |
| 17 | .10748 | .1580 | 1.4700 | .0000E+00 |
| 18 | .08199 | .1580 | 1.9270 | .0000E+00 |
| 19 | .10748 | .1580 | 1.4700 | .1000E+00 |
| 20 | .08199 | .1580 | 1.9270 | .0000E+00 |
| 21 | .10748 | .1580 | 1.4700 | .1000E+00 |
| 22 | .08199 | .1580 | 1.9270 | .0000E+00 |
| 23 | .05374 | .0790 | 1.4700 | .0000E+00 |
| 24 | .02802 | .0540 | 1.9270 | .0000E+00 |
| 25 | .07347 | .1080 | 1.4700 | .0000E+00 |
| 26 | .05605 | .1080 | 1.9270 | .0000E+00 |
| 27 | .07347 | .1080 | 1.4700 | .0000E+00 |
| 28 | .05605 | .1080 | 1.9270 | .0000E+00 |
| 29 | .07347 | .1080 | 1.4700 | .0000E+00 |
| 30 | .05605 | .1080 | 1.9270 | .0000E+00 |
| 31 | .07347 | .1080 | 1.4700 | .0000E+00 |
| 32 | .05605 | .1080 | 1.9270 | .0000E+00 |
| 33 | .07347 | .1080 | 1.4700 | .0000E+00 |
| 34 | .05605 | .1080 | 1.9270 | .0000E+00 |
| 35 | .07347 | .1080 | 1.4700 | .0000E+00 |
| 36 | .05605 | .1080 | 1.9270 | .0000E+00 |
| 37 | .07347 | .1080 | 1.4700 | .0000E+00 |
| 38 | .05605 | .1080 | 1.9270 | .0000E+00 |
| 39 | .07347 | .1080 | 1.4700 | .1000E+00 |
| 40 | .05610 | .1081 | 1.9270 | .0000E+00 |
| 41 | .07347 | .1080 | 1.4700 | .1000E+00 |
| 42 | .05605 | .1080 | 1.9270 | .0000E+00 |
| 43 | .07347 | .1080 | 1.4700 | .0000E+00 |
| 44 | .05605 | .1080 | 1.9270 | .0000E+00 |
| 45 | .07347 | .1080 | 1.4700 | .0000E+00 |
| 46 | .02802 | .0540 | 1.9270 | .0000E+00 |
| MED(MM) | .00000 | | 1.0000 | .0000E+00 |

We claim:

1. A color filter comprising a transparent substrate and two or more multilayer films of amorphous silicon materials deposited on said substrate, each film being different, each layer of said two or more multi-layer films having a thickness less than the wavelength of the visible light, and at least three layers of said two or more multilayer films of amorphous silicon materials in an alternate arrangement wherein the amorphous silicon materials are selected from a-SiOx and a-SiNx.

2. The color filter as set forth in claim 1 wherein the first layer of the film on said substrate is a-SiOx layer.

3. The color filter as set forth in claim 2 wherein a total of 46 layers are deposited on said substrate.

4. The color filter as set forth in claim 1 wherein the substrates are glass or plastics.

5. A color filter comprising two transparent substrates bonded together, a multilayer film A formed on one surface of the bonded substrates and a multilayer film B formed on the other surface, said multilayer film A and multilayer film B having at least three layers of amorphous silicon materials selected from a-SiOx and a-SiNx.

6. The color filter as set forth in claim 5 wherein the layers of amorphous silicon materials, a-SiOx layer and a-SiNx layer, are in an alternating arrangement.

7. The color filter as set forth in claim 5 wherein the substrate is glass or plastics.

8. The color filter as set forth in claim 5 wherein the two substrates are bonded by a visible optical cement.

9. The color filter as set forth in claim 5 wherein the multilayer film is formed by PECVD method.

10. A color filter comprising two transparent substrates bonded together, a multilayer film A formed on one surface of the bonded substrates and a multilayer film B formed on the other surface, said multilayer film A and multilayer film B having at least three layers of amorphous silicon materials selected from a-SiOx and a-SiNx, wherein said at least three layers of amorphous silicon materials are in an alternating arrangement, and wherein said color filter is a red color filter, said multilayer film A has 17 layers and said multilayer film B has 21 layers.

11. The color filter as set forth in claim 10 wherein the a-SiOx and the a-SiNx used in said multilayer film A have a refracitive index of about 1.47 and about 2.2 respectively; the a-SiOx and the a-SiNx used in said multilayer film B have a refractive index of about 1.47 and about 2.14 respectively; and the substrate has a refractive index of about 1.52.

12. The color filter as set forth in claim 11 wherein the first layer of said multilayer film A is a-SiNx layer, the second layer is a a-SiOx layer; and the first layer of said multilayer film B is a-SiNx layer and the second layer is a-SiOx layer.

13. A color filter comprising two transparent substrates bonded together, a multilayer film A formed on one surface of the bonded substrates and a multilayer film B formed on the other surface, said multilayer film A and multilayer film B having at least three layers of amorphous silicon materials selected from a-SiOx and a-SiNx, Wherein said at least three layers of amorphous silicon materials are in an alternating arrangement, and wherein said color filter is a green color filter, said multilayer film A has 23 layers and said multilayer film B has 21 layers.

14. The color filter as set forth in claim 13 wherein the first layer of said multilayer film A is a-SiOx layer and the second layer is a-SiOx layer; and the first layer of said multilayer film B is a-SiOx layer and the second layer is a-SiNx layer.

15. The color filter as set forth in claim 14 wherein the a-SiNx used in said multilayer films A and B has a refractive index of about 1.927, the a-SiOx used has a refractive index of about 1.47 and the substrate used has a refractive index of about 1.52.

16. A color filter comprising two transparent substrates bonded together, a multilayer film A formed on one surface of the bonded substrates and a multilayer film B formed on the other surface, said multilayer film A and multilayer film B having at least three layers of amorphous silicon materials selected from a-SiOx and a-SiNx, wherein said at least three layers of amorphous silicon materials are in an alternating arrangement, and wherein said color filter is a blue color filter, said multilayer film A has 17 layers and said multilayer film B has 17 layers.

17. The color filter as set forth in claim 16 wherein the first layer of said multilayer films A and B are a-SiOx layers and the second layer thereof are a-SiNx layers.

18. The color filter as set forth in claim 17 wherein the a-SiOx used in said multilayer films A and B has a refractive index of about 1.47, the a-SiNx used has a refractive index of about 1.927 and the substrate used has a refractive index of about 1.52.

19. A method for .preparing the color filter which comprises pre-determinating deposition conditions for multilayer films of amophous silicon materials by an optimization technique, forming two or more different multilayer films by depositing layers of the amorphous silicon materials on the surface of a transparent substrate by PECVD method, wherein the amorphous silicon materials are selected from a-SiOx and a-SiNx.

20. A method as set forth in claim 19 wherein $SiH_4$ and $N_2O$ are used when depositing a-SiOx layers and $SiH_4$ and $N_2$ are used when depositing a-SiNx layers.

21. A method as set forth in claim 20 wherein $NH_3$ is admixed with $SiH_4$ and $N_2$ when depositing a-SiNx layers.

* * * * *